(12) United States Patent
Konik et al.

(10) Patent No.: US 9,996,565 B2
(45) Date of Patent: *Jun. 12, 2018

(54) MANAGING AN INDEX OF A TABLE OF A DATABASE

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/209,991

(22) Filed: Jul. 14, 2016

(65) Prior Publication Data

US 2016/0342638 A1    Nov. 24, 2016

Related U.S. Application Data

(63) Continuation of application No. 14/259,926, filed on Apr. 23, 2014, now Pat. No. 9,454,558.

(51) Int. Cl.
*G06F 17/30* (2006.01)
*G06F 17/22* (2006.01)

(52) U.S. Cl.
CPC .. *G06F 17/30321* (2013.01); *G06F 17/30339* (2013.01); *G06F 17/30477* (2013.01); *G06F 17/2264* (2013.01)

(58) Field of Classification Search
None
See application file for complete search history.

(56) References Cited

U.S. PATENT DOCUMENTS

| 7,865,491 B2 | 1/2011 | Dettinger et al. |
| 2008/0297373 A1 | 12/2008 | Hayakawa et al. |
| 2009/0210441 A1* | 8/2009 | Mercer ............ G06F 17/30905 |

(Continued)

OTHER PUBLICATIONS

List of IBM Patents or Patent Applications Treated as Related, Jul. 13, 2016, 2 pgs.

(Continued)

*Primary Examiner* — Hung Q Pham
(74) *Attorney, Agent, or Firm* — Robert J. Shatto

(57) ABSTRACT

A method, a system, and a computer program product for managing a database are disclosed. Managing the database includes managing an index of a table of the database. Managing the index includes determining the table includes a first field having a first input value configured to identify a first dynamic data function utilized to determine a first output value for the first field. In embodiments, managing the index includes determining the first dynamic data function is deterministic, determining the first output value for the first field using the first dynamic data function, and storing the first output value for the first field. In embodiments, managing the index includes determining the first dynamic data function is nondeterministic, determining a first special value to represent the first output value for the first field, and storing the first special value for the first field.

18 Claims, 8 Drawing Sheets

(56) References Cited

U.S. PATENT DOCUMENTS

| 2012/0054222 | A1 | 3/2012 | Soby |
| 2012/0176386 | A1 | 7/2012 | Hutchins |
| 2012/0303633 | A1* | 11/2012 | He ................ G06F 17/30442 707/745 |
| 2013/0031073 | A1 | 1/2013 | Mercer et al. |
| 2015/0310045 | A1 | 10/2015 | Konik et al. |
| 2015/0310049 | A1 | 10/2015 | Konik et al. |
| 2015/0310050 | A1 | 10/2015 | Konik et al. |
| 2015/0310052 | A1 | 10/2015 | Konik et al. |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs. pages.
Unknown, "Generated Columns", IBM, DB2 Version 9.7 for Linux, UNIX, and Windows, 2 pgs., printed Sep. 11, 2013.
List of IBM Patents or Patent Applications Treated as Related, Sep. 27, 2016, 2 pgs.
Konik et al., "Managing a Table of a Database," U.S. Appl. No. 15/280,043, filed Sep. 29, 2016.
Konik et al., "Managing a Table of a Database," U.S. Appl. No. 15/280,064, filed Sep. 29, 2016.

* cited by examiner

MANAGING AN INDEX OF A TABLE OF A DATABASE

TECHNICAL FIELD

This disclosure relates generally to database management systems and, more particularly, relates to dynamic data configured to be updated by a dynamic data function.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to dynamic data.

SUMMARY

Aspects of the disclosure include a method, a system, and a computer program product for managing a database. Managing the database may include managing a table of the database. The table may have a set of fields. The set of fields can include a first field in a first row of the table.

Managing the table includes selecting, in the first field, a first input value. The first input value can be configured to identify a first dynamic data function. The first dynamic data function may be utilized to determine a first output value for the first field. Managing the table includes determining the first output value for the first field. The first output value for the first field may be determined using the first dynamic data function. The first output value for the first field may be determined in response to a read request including the first field. Managing the table includes returning (for the read request) the first output value for the first field. The first output value for the first field may be returned in response to determining the first output value for the first field.

Managing the database may include managing an index of the table of the database. Managing the index includes determining the table includes a first field. The first field may have a first input value. The first input value can be configured to identify a first dynamic data function. The first dynamic data function can be utilized to determine a first output value for the first field.

Managing the index may include determining the first dynamic data function is deterministic. The first dynamic data function may be determined to be deterministic in response to a request to create the index including the first field. Managing the index may include determining the first output value for the first field. The first output value for the first field may be determined using the first dynamic data function. The first output value for the first field may be determined in response to the first dynamic data function being deterministic. Managing the index may include storing (in the index) the first output value for the first field. The first output value for the first field may be stored in response to determining the first output value for the first field.

Managing the index may include determining the first dynamic data function is nondeterministic. The first dynamic data function may be determined to be nondeterministic in response to a request to create the index including the first field. Managing the index may include determining a first special value. The first special value can represent the first output value for the first field. The first special value may be determined in response to the first dynamic data function being nondeterministic. Managing the index may include storing (in the index) the first special value for the first field. The first special value for the first field may be stored in response to determining the first special value for the first field.

DETAILED DESCRIPTION

Figure 1A:
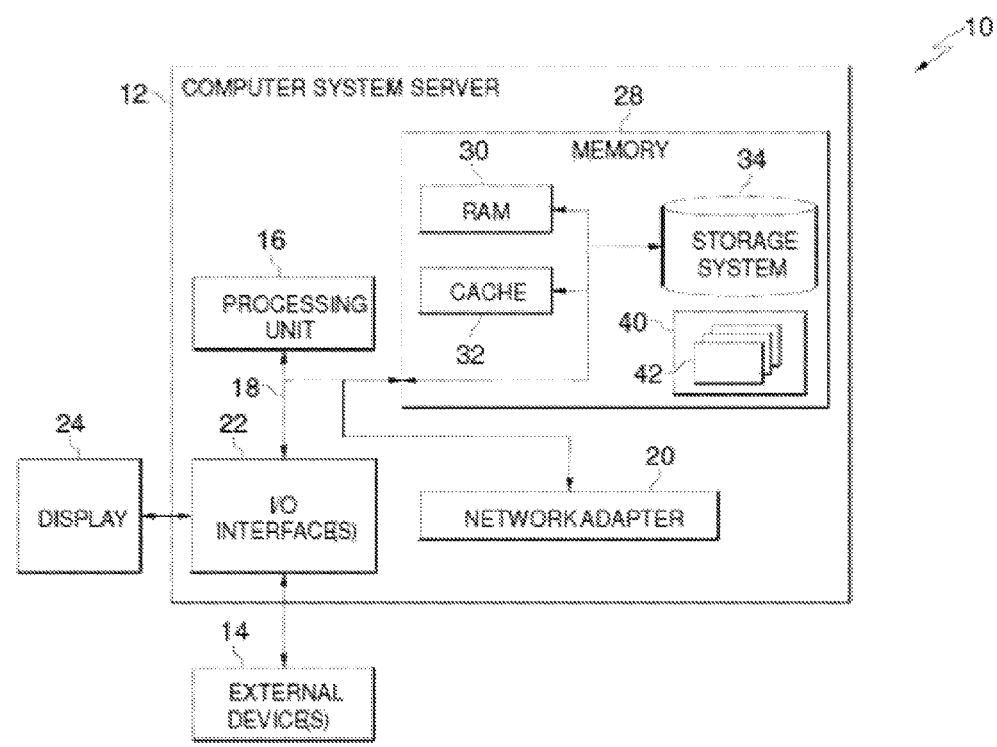
FIG. 1A depicts a cloud computing node according to embodiments.

Aspects of the disclosure define a field (of a column) in a row of a table of a database such that the field is a dynamic data value (not a fixed value). The dynamic data value can be a current value of a dynamic data function (DDF) when data is read. To illustrate, a DDF can be a special register, a function, a procedure, a structured query language (SQL) statement, a program call, or some SQL data manipulation operation. Aspects of the disclosure define the DDF for the field. The DDF in the field could be invoked to retrieve dynamic data (e.g., dynamic data related to a user instead of fixed data stored with the row—for instance, this may have a positive impact in situations where at least one feature of the user changes). As an example, aspects could have positive impacts when applications are rolled out to many virtual servers (e.g., thousands) in a cloud environment.

Aspects of the disclosure include invoking the DDF when a dynamic data value is in the particular field being read (e.g., a value tagged with a special character is in the particular field). According to embodiments of the disclosure, when such a row is read, the DDF is invoked to retrieve the real value for the field of the column when a special tagged dynamic data value is in the field. As such, a tagged dynamic data operation can be defined for any or all rows of any or all columns of a file, which can give flexibility for the data returned. Such aspects may be unlike a trigger or column mask (e.g., may not need to invoke a function or procedure for every column of every row every time the row is used—but instead invoke it when a special tagged dynamic data value is in that field thereby indicating the function or procedure needs to get the real value for tagged dynamic data for the field).

Aspects of the disclosure include establishing indexes that use the DDF value. A database management system (DBMS) manager can determine if the DDF is deterministic or nondeterministic. If the DDF in the field is deterministic, the DBMS manager could determine the value for the field and use that value in the index for the field. If the DDF in the field is nondeterministic, a special value could be placed in the index that could be used by the DBMS manager as the index is being checked to trigger the DBMS manager to retrieve the DDF value for the field from the DDF when checking the values in the index. Accordingly, a key of the index for a DDF field may be defined. Thus, the index for the field can contain traditional values (e.g., fixed values), the DDF values (e.g., as computed when deterministic), and the special value (when nondeterministic).

Aspects of the disclosure include a method, a system, and a computer program product for managing a database. Managing the database may include managing a table of the database. The table may have a set of fields. The set of fields can include a first field in a first row of the table.

Managing the table includes selecting, in the first field, a first input value. The first input value can be configured to identify a first dynamic data function. The first dynamic data function may be utilized to determine a first output value for the first field. Managing the table includes determining the first output value for the first field. The first output value for the first field may be determined using the first dynamic data function. The first output value for the first field may be determined in response to a read request including the first field. Managing the table includes returning (for the read request) the first output value for the first field. The first output value for the first field may be returned in response to determining the first output value for the first field.

Managing the database may include managing an index of the table of the database. Managing the index includes determining the table includes a first field. The first field may have a first input value. The first input value can be configured to identify a first dynamic data function. The first dynamic data function can be utilized to determine a first output value for the first field.

Managing the index may include determining the first dynamic data function is deterministic. The first dynamic data function may be determined to be deterministic in response to a request to create the index including the first field. Managing the index may include determining the first output value for the first field. The first output value for the first field may be determined using the first dynamic data function. The first output value for the first field may be determined in response to the first dynamic data function being deterministic. Managing the index may include storing (in the index) the first output value for the first field. The first output value for the first field may be stored in response to determining the first output value for the first field.

Managing the index may include determining the first dynamic data function is nondeterministic. The first dynamic data function may be determined to be nondeterministic in response to a request to create the index including the first field. Managing the index may include determining a first special value. The first special value can represent the first output value for the first field. The first special value may be determined in response to the first dynamic data function being nondeterministic. Managing the index may include storing (in the index) the first special value for the first field. The first special value for the first field may be stored in response to determining the first special value for the first field.

It is understood in advance that although this disclosure includes a detailed description regarding cloud computing, implementation of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1A, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
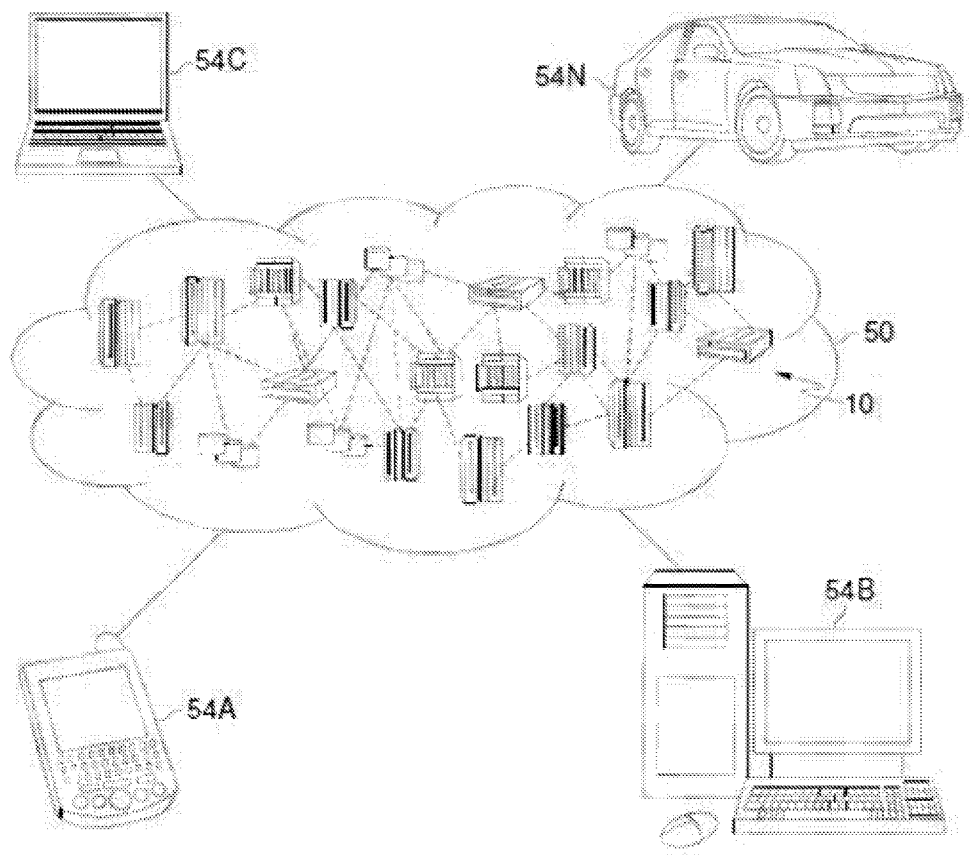
FIG. 1B depicts a cloud computing environment according to embodiments.

Referring now to FIG. 1B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 1C:
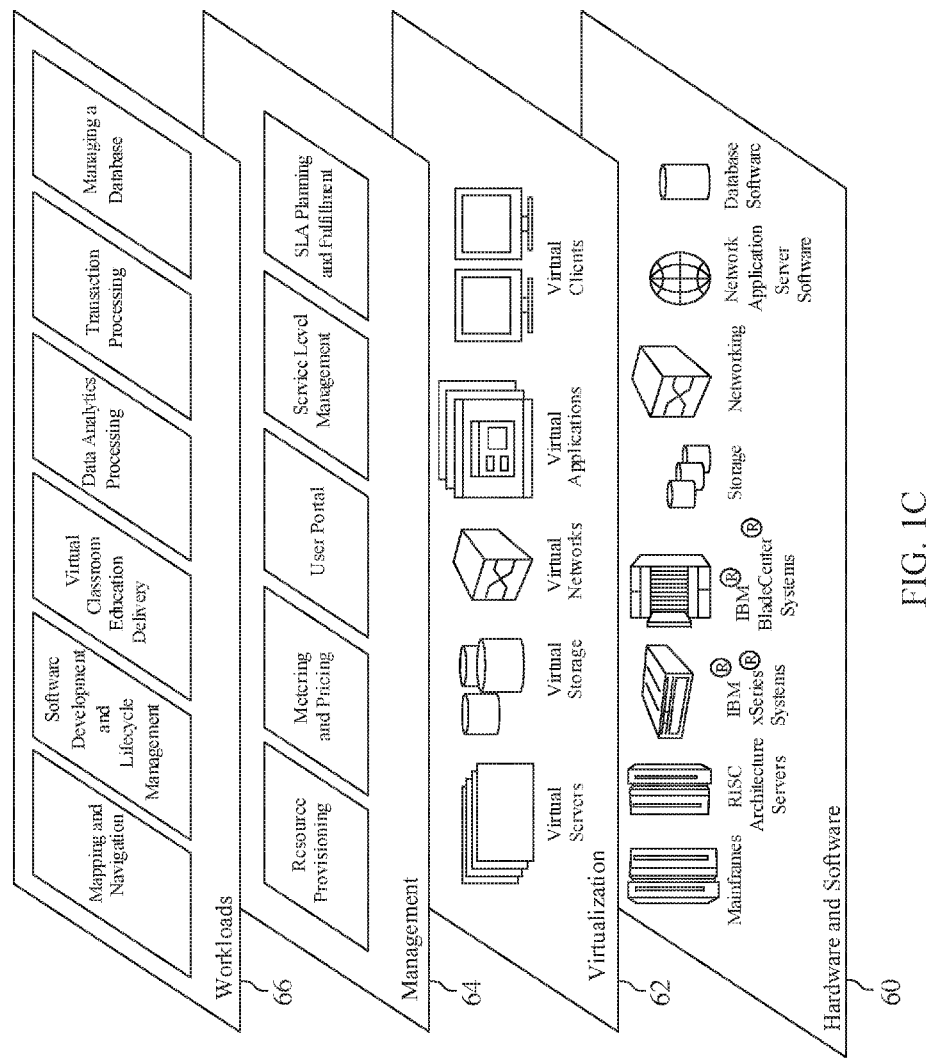
FIG. 1C depicts abstraction model layers according to embodiments.

Referring now to FIG. 1C, a set of functional abstraction layers provided by cloud computing environment 50 (FIG. 1B) is shown. It should be understood in advance that the components, layers, and functions shown in FIG. 1C are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing a database. Aspects of managing the database may include managing a table of the database or managing an index of the table of the database. For example, in a cloud environment/system, a first virtual machine may be saved into an image. From the image, n virtual machines can be created. At least a plurality (e.g., each one) of the n virtual machines will need some amount of configuration to make them unique virtual machines in the cloud environment/system. In an embodiment, a dynamic data function (DDF) may be stored in the database of an image which defines the machines name or IP address. After creating the n virtual machines, when the field is read on a selected virtual machine, the DDF may return the current system name or current Internet Protocol (IP) address of the selected virtual machine. Thus, each of the n virtual machines can retrieve their current system name or IP address from the database via such logic (and further configuration may be unnecessary). Aspects of managing the database may have positive impacts on performance or efficiency of the DBMS.

Figure 2A:
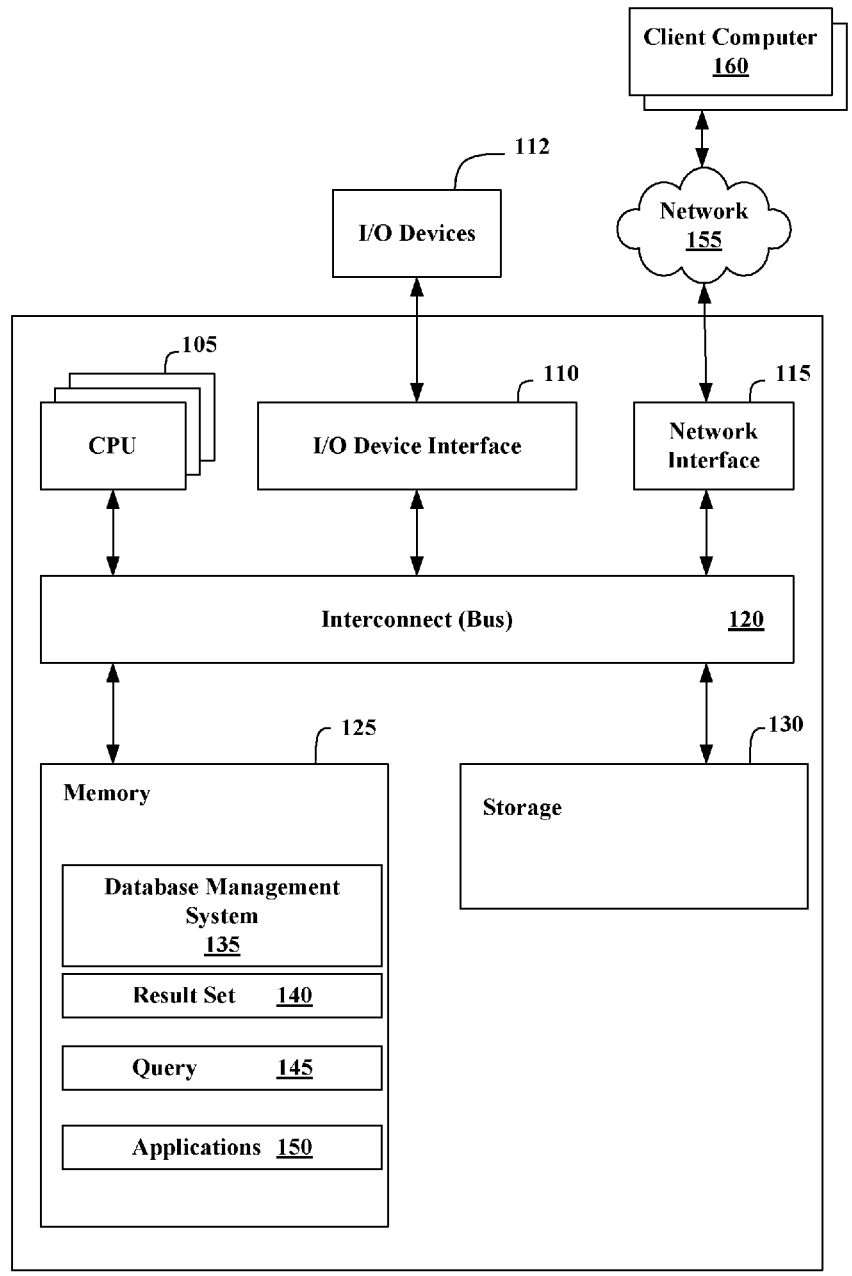
FIG. 2A illustrates an example representation of a computer system connected to a client computer via a network according to an embodiment.

FIG. 2A illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIGS. 2A and 2B.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2B:
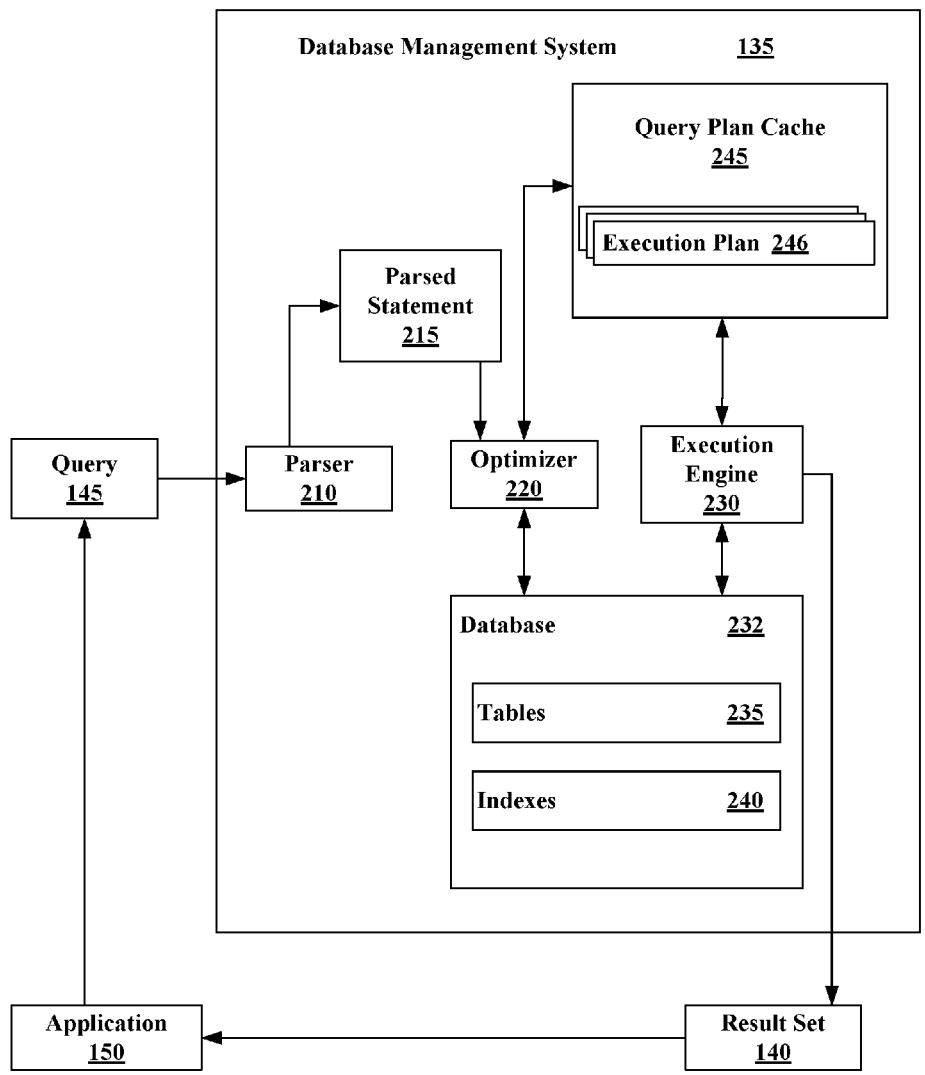
FIG. 2B illustrates an example database management system (DBMS) according to an embodiment.

FIG. 2B illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

Figure 3:
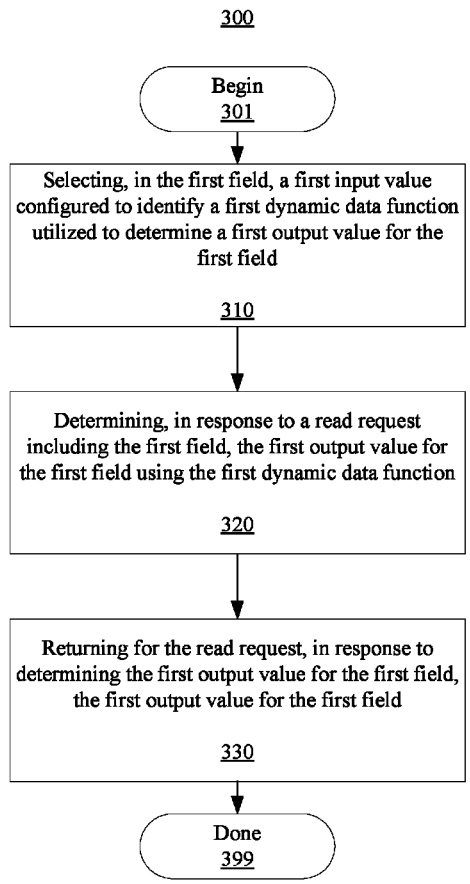
FIG. 3 is a flowchart illustrating a method of managing a database according to embodiments.

FIG. 3 is a flowchart illustrating a method 300 of managing a database according to embodiments. Managing the database may include managing a table of the database. The table may have a set of fields. The set of fields can include a first field in a first row of the table. In embodiments, the set of fields can include a second field in a second row of the table. The first and second fields can be in a first column of the table. The method 300 begins at block 301.

At block 310, a first input value may be selected in the first field. Selecting can include, for example, establishing or storing. The first input value can be configured to identify a first dynamic data function. The first dynamic data function may be utilized to determine a first output value for the first field. In embodiments, block 310 can include establishing, in the first field, a first stored value that indicates the first dynamic data function is utilized to ascertain the first output value for the first field.

In embodiments, the first input value includes a tag or marker to identify the first dynamic data function (e.g., using "%" as part of the first input value such as at the beginning and end of the entry). For example, a date column of a table may have an example field with a DDF for the current date where the contents of the example field are "% $AND_{13}$ $CURRENT_{13}$ DATE %". In embodiments, a first dynamic data function definition defines the first dynamic data function. In embodiments, the first dynamic data function definition may be stored in a data structure. In embodiments, the first dynamic data function definition may be stored in a bit map. In embodiments, the first dynamic data function definition may be stored in a multi-dimensional array. In embodiments, the first dynamic data function can be a special register, a function, a procedure, a structured query language (SQL) statement, a program call, an internet protocol (IP) address, etc.

In embodiments, a second stored value may be selected in the second field. The second stored value may be different from the first input value. In embodiments, the second stored value is a second input value configured to identify a second dynamic data function (e.g., two distinct dynamic data functions in one column). In certain embodiments, the second stored value is configured to identify a feature other than a dynamic data function (i.e., the second stored value is not configured to identify a dynamic data function). In certain embodiments, the second stored value is fixed data (e.g., data entered/written that can be changed by a delete/update). In such embodiments, the first column may include both a dynamic data function (e.g., the first dynamic data function in the first field) and fixed data (e.g., the second stored value which is fixed data in the second field).

Aspects of the disclosure do not require a column definition to include a particular dynamic data function (e.g., to apply the first dynamic data function to the entire column). In embodiments, the column definition, for a column having the first field, includes absence of the first dynamic data function. Put differently, the first dynamic data function is not included in a column definition for the first column (which has the first field). As such, the first column in its entirety need not be coupled with the first dynamic data function (the first field, by itself, can be coupled with the first dynamic data function). Aspects of the disclosure may allow for the particular dynamic data function to be implemented for a specifically chosen field rather than an entire column.

At block 320, the first output value for the first field may be determined. The first output value for the first field may be determined using the first dynamic data function. The first output value for the first field may be determined in response to a read request including the first field. In embodiments, determining can include at least one of computing or calculating (e.g., using an algorithm). In embodiments, the first and second fields of the first column are determined differently in response to the read request (e.g., two distinct dynamic data functions, one is dynamic data function and one is fixed data). For example, the first output value for the first field in the first column may be computed using the first dynamic data function to determine a changing IP address and the second output value for the second field in the first column may be a fixed value of 123456789.

At block 330, the first output value for the first field may be returned (for the read request). The first output value for the first field may be returned in response to determining the first output value for the first field. In embodiments, returning can include publishing (e.g., on a server). In embodiments, returning can include transmitting (e.g., from a server to a client computer). In embodiments, returning can include providing (e.g., to a database). In embodiments, returning can include displaying (e.g., on a display system such as a monitor). For example, the changing IP address could be returned/published/transmitted/provided/displayed. Similarly, the second output value for the second field may be returned; in the example, the fixed value of 123456789 may be returned/published/transmitted/provided/displayed.

Method 300 may conclude at block 399. Method 300 may have positive impacts on performance or efficiency of the DBMS. As a first illustrative case, when creating the table, the table could be defined in the following example definition:

| CREATE TABLE QSYS/TABLE1 | |
| --- | --- |
| CLIENT_ADDRESS | CHAR (300), |
| CLIENT_TRANS | CHAR (500), |
| CLIENT_SERVER | CHAR (256); |

When a field is inserted, a user could enter in a client address, a client transaction, and a function entered in the field for CLIENT_SERVER which would be the SERVER_NAME function. When that field is read, the database manager could invoke the SERVER_NAME function and retrieve the server address. A "%" tag could be used to mark the dynamic data function (DDF) operation definable by the user:

Insert into file values('1435 Woodhucklebury Drive New York' 'buying 10 shares of stock' 'HTTP/:"||% Current server %||"'/@acmecompanynameforwidgets.com')
Insert into file values('1436 Woodhucklebury Drive New York' 'buying 100 shares of stock' 'HTTP/:RCHVIKES/@acmecompanynameforwidgets.com')
Insert into file values('1437 Woodhucklebury Drive New York' 'buying 1000 shares of stock' 'HTTP/:"% Select hostname from file1%||"'/@acmecompanynameforwidgets.com')

When the rows are read:
Rcd 1: 1435 Woodhucklebury Drive New York' 'buying 10 shares of stock' 'HTTP/:System 1/@acmecompanynameforwidgets.com' (Note: current$_{13}$ server returned)
Rcd 2: 1436 Woodhucklebury Drive New York"buying 100 shares of stock' 'HTTP/:RCHVIKES/@acmecompanynameforwidgets.com'
Rcd 3: 1437 Woodhucklebury Drive New York"buying 1000 shares of stock' 'HTTP/:SERVER_FILESYSTEM@acmecompanynameforwidgets.com' (Note: server name from file1)

Aspects of the disclosure, as shown in the first illustrative case, allow a DDF to be defined for a field in the table. The DDF may be invoked to retrieve the data related to the user and not the data stored with the field. The data can be tagged dynamic data of the DDF.

In a second illustrative case, similar to the first illustrative case, the table QSYS/TABLE1 can be copied to a different system. The values for the server may not be constant values, but the real server values; for example, the file in System 1 and System 2 as in the steps that follow which 1) Create the table on System 1, 2) Insert rows on System 1, and 3) Save the table from System and restore on System 2:

| CREATE TABLE QSYS/TABLE1 | |
| --- | --- |
| CLIENT_ADDRESS | CHAR (300), |
| CLIENT_TRANS | CHAR (500), |
| CLIENT_SERVER | CHAR (256); |

Insert into file values('1435 Woodhucklebury Drive New York' 'buying 10 shares of stock' 'HTTP/:"||% Current server %||"'/@acmecompanynameforwidgets.com')
Insert into file values('1436 Woodhucklebury Drive New York' 'buying 100 shares of stock' 'HTTP/:RCHVIKES/@acmecompanynameforwidgets.com')
Insert into file values('1437 Woodhucklebury Drive New York' 'buying 1000 shares of stock' 'HTTP/:"% Select hostname from file2)% ||"'/@acmecompanynameforwidgets.com')

System 1

TABLE 1

Rcd 1: 1435 Woodhucklebury Drive New York' 'buying 10 shares of stock'
'HTTP/:SYSTEM1/@acmecompanynameforwidgets.com'
Rcd 2: 1436 Woodhucklebury Drive New York' 'buying 100 shares of stock'
'HTTP/:RCHVIKES/@acmecompanynameforwidgets.com'
Rcd 3: 1437 Woodhucklebury Drive New York' 'buying 1000 shares of stock'
'HTTP/:SERVER_FILESYSTEM@acmecompanynameforwidgets.com'

SAVOBJ TABLE1 from System 1
RSTOBJ TABLE1 to System 2
System 2

TABLE 1

Rcd 1: 1435 Woodhucklebury Drive New York' 'buying 10 shares of stock'
'HTTP/:SYSTEM2/@acmecompanynameforwidgets.com'
Rcd 2: 1436 Woodhucklebury Drive New York' 'buying 100 shares of stock'
'HTTP/:RCHVIKES/@acmecompanynameforwidgets.com'
Rcd 3: 1437 Woodhucklebury Drive New York' 'buying 1000 shares of stock'
'HTTP/:SERVER_FILESYSTEM@acmecompanynameforwidgets.com'

A special/placeholder/indicator value may be stored in the field in the data space to indicate that a DDF is used to determine the value of the field. Since each field of every row across every column could contain a DDF, a bit map or a multi-dimensional array may be utilized to store the DDF definition(s) used for fields. In embodiments, it may be a few DDFs across the table. In other embodiments, every field may have a DDF. In embodiments, the returned value of the DDF is compatible with the data type for the field. In embodiments, the tag (e.g., "% %") can be utilized to mark the DDF to be used. In embodiments, the tag may be definable/configurable by the user.

In embodiments, aspects of the disclosure may not invoke a function/procedure/etc. for every column of every row every time the field/row is used (e.g., unlike a trigger or column mask). In such embodiments, invocation may occur in response to a special tagged dynamic data value being in/inserted-into a field indicating the function or procedure may/should get the real value for tagged dynamic data for the column. For example, if a READ trigger is in place on a row, each time a row is read, the trigger function must be invoked. According to embodiments of the disclosure, each time a row is read, only if a special tagged dynamic data value is in the field (of the column) will the DDF need to be invoked to retrieve the real value for the column. Accordingly, a tagged dynamic data operation can be defined for any or all rows of any or all columns of a file (e.g., any or all fields), which can provide flexibility with respect to the data returned. In embodiments, the DDF enabled field can be a special type of field, versus pure CHAR; for example:

| CREATE TABLE QSYS/TABLE1 | |
|---|---|
| CLIENT_ADDRESS | CHAR_DDF (300), |
| CLIENT_TRANS | CHAR_DDF (500), |
| CLIENT_SERVER | CHAR_DDF (256); |

Figure 4:
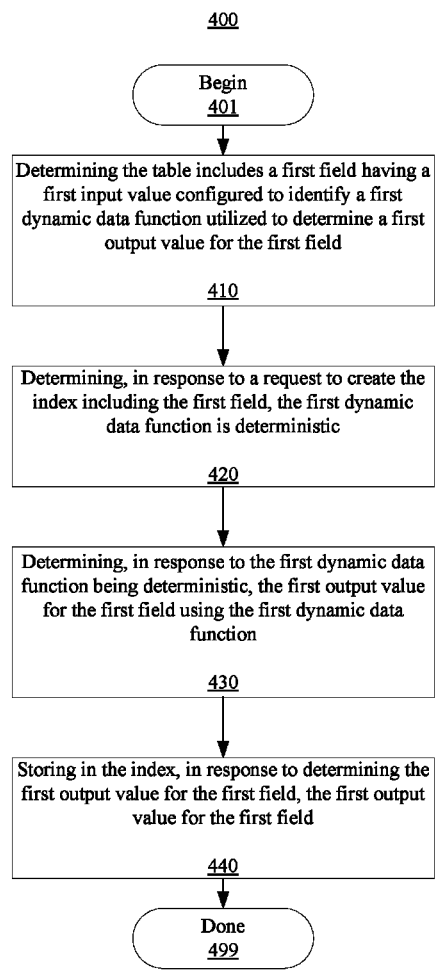
FIG. 4 is a flowchart illustrating a method of managing a database according to embodiments.
Figure 5:
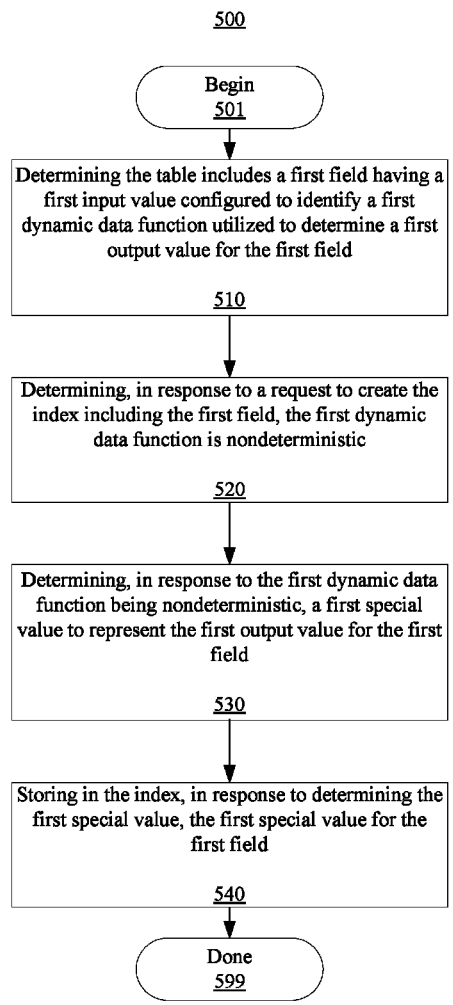
FIG. 5 is a flowchart illustrating a method of managing a database according to embodiments.

FIG. 4 and FIG. 5 are flowcharts illustrating methods of managing a database according to embodiments. The methods 400 and 500 may be methods for indexing. The methods for indexing may include determination as to whether a dynamic data function is deterministic or nondeterministic. Such determination may have positive impacts on performance or efficiency for indexing (e.g., in an embodiment having a value to return and not needing to calculate a return value for a DDF).

Deterministic functions/algorithms can include functions/algorithms which, given a particular input, will always produce the same output, with the underlying machine always passing through the same sequence of states. Non-deterministic functions/algorithms can exhibit different behaviors on different runs (as opposed to a deterministic algorithm). In embodiments, a particular field having the dynamic data function may indicate whether the dynamic data function is deterministic or nondeterministic (e.g., a checkbox system). In embodiments, partially deterministic may be an option. In embodiments, partially deterministic may be a subset of deterministic or nondeterministic based on a predetermined choice, a user preference, or an algorithmic analysis.

FIG. 4 is a flowchart illustrating a method 400 of managing a database according to embodiments. The method 400, which may be a method for indexing, begins at block 401. Managing the database may include managing an index of a table (e.g., the table may be as in FIG. 3/method 300) of the database.

At block 410, it may be determined that the table includes a first field of a set of fields (the first field may be in a first row and a first column). The first field may have a first input value. The first input value can be configured to identify a first dynamic data function. The first dynamic data function can be utilized to determine a first output value for the first field. In embodiments, the first dynamic data function can include a specific system function (e.g., server IP address). In embodiments, a specific index may be created over a column for the specific system function (e.g., index of IP addresses).

At block 420, it may be determined that the first dynamic data function is deterministic. Deterministic functions/algorithms can include functions/algorithms which, given a particular input, will always produce the same output, with the underlying machine always passing through the same sequence of states. The first dynamic data function may be determined to be deterministic in response to a request to create the index including the first field. In embodiments, determining the first dynamic data function is deterministic can include analyzing (e.g., parsing) a first dynamic data function definition that defines the first dynamic data function. For example, two structures may be utilized. A first structure may determine (e.g., yes/no) whether any field in a given row has tagged data. A second structure may define what the tags are. A bit map or a multi-dimensional array may be used. In embodiments, the first dynamic data function definition may be stored in the bit map. In embodiments, the first dynamic data function definition may be stored in the multi-dimensional array. Other implementations, including other combinations, are contemplated.

In embodiments, determining the first dynamic data function is deterministic may include determining the first dynamic data function is a query. As such, determining the first dynamic data function is deterministic may include determining a result of the query to be unchanged based on a data-change temporal-identifier. For example, the result of the query may have a first computed result that includes 1444 records and has a 02292012_00123105 identifier (e.g., representing Feb. 29, 2012 at 12:31:05 pm) when the query is run on Apr. 15, 2012 (tax day 2012). In addition, the result of the query may have a second computed result that includes 1444 records and has a 02292012_00123105 identifier (e.g., representing Feb. 29, 2012 at 12:31:05 pm) when the query is run on Apr. 15, 2013 (tax day 2013). The fact that the two results both contain 1444 records may be persuasive that the results are the same (e.g., the data needed/computed for the query has not changed such as no more sales of a particular product have been made) but the fact that the identifier is 02292012_00123105 may prove conclusively that the results are the same. Thus, the data-change temporal-identifier may be useful to determine the result of the query may be unchanged. As another example, the data-change temporal-identifier may be a timestamp of the last change (insert/update/delete) of a table. Thus, if a table has not changed since the output value (for the dynamic data function) was determined, any queries over it will return the same value. Therefore the dynamic data function can keep using the cached output value until the timestamp on the table changes.

In embodiments, determining the first dynamic data function is deterministic may include determining the first dynamic data function is a specific system function. As such, determining the first dynamic data function is deterministic may include determining a computed value of the specific system function to be unchanged based on a varied-parameter for the specific system function. For example, consider a case where the specific system function uses the law of exponents where a number to a zero power equals one (i.e., $n^0=1$). In the case where this is the first dynamic data function, the first dynamic data function may be considered deterministic because the computed value of the specific system function (i.e., the computed value is 1) is unchanged based on the varied-parameter (i.e., n) for the specific system function) ($n^0$). As another example, a determined/computed value for a set of digits of an IP address for a data center used for cloud computing may be consistent regardless of a varied-parameter such as a building number for a set of servers at a given data warehouse.

At block 430, the first output value for the first field may be determined. The first output value for the first field may be determined using the first dynamic data function. The first output value for the first field may be determined in response to the first dynamic data function being deterministic.

At block 440, the first output value for the first field may be stored (in the index). The first output value for the first field may be stored in response to determining the first output value for the first field. In embodiments, a sparse index may be created using the first output value for the first field. In embodiments, the index may be created on a first system. A request to create the index on a second system may occur, be instantiated, or be received. The index on the first system may be invalidated, archived, or deleted (in response to the request to create the index on the second system). Using the first dynamic data function, the index may be created on the second system. For example, the first output value for the first field may be stored (in the index) on the first system and subsequently the first output value for the first field may be stored (in the index) on the second system (and the index on the first system may be invalidated contemporaneously). Method 400 may conclude at block 499. Method 400 may have positive impacts on performance or efficiency of the DBMS.

FIG. 5 is a flowchart illustrating a method 500 of managing a database according to embodiments. The method 500, which may be a method for indexing, begins at block 501. Managing the database may include managing an index of a table (e.g., the table may be as in FIG. 3/method 300) of the database.

At block 510, it may be determined that the table includes a first field of a set of fields (the first field may be in a first row and a first column). The first field may have a first input value. The first input value can be configured to identify a first dynamic data function. The first dynamic data function can be utilized to determine a first output value for the first field. In embodiments, the first dynamic data function can include a specific system function (e.g., server IP address). In embodiments, a specific index may be created over a column for the specific system function (e.g., index of IP addresses).

At block 520, it may be determined that the first dynamic data function is nondeterministic. Nondeterministic functions/algorithms can exhibit different behaviors on different runs (as opposed to a deterministic algorithm). For example, race conditions, random number generators, or polynomial/exponential times can be associated with nondeterministic functions/algorithms. The first dynamic data function may be determined to be nondeterministic in response to a request to create the index including the first field.

In embodiments, determining the first dynamic data function is nondeterministic can include analyzing (e.g., parsing) a first dynamic data function definition that defines the first dynamic data function. For example, two structures may be utilized. A first structure may determine (e.g., yes/no) whether any field in a given row has tagged data. A second structure may define what the tags are. A bit map or a multi-dimensional array may be used. In embodiments, the first dynamic data function definition may be stored in the bit map. In embodiments, the first dynamic data function definition may be stored in the multi-dimensional array. Other implementations, including other combinations, are contemplated.

In embodiments, determining the first dynamic data function is nondeterministic may include determining the first dynamic data function is a query. As such, determining the first dynamic data function is nondeterministic may include determining a result of the query to be changed based on a data-change temporal-identifier. For example, the result of the query may have a first computed result that includes 1444 records and has a 02292012_00123105 identifier (e.g., representing Feb. 29, 2012 at 12:31:05 pm) when the query is run on Apr. 15, 2012 (tax day 2012). In addition, the result of the query may have a second computed result that includes 1444 records and has a 03312013_00145645 identifier (e.g., representing Mar. 31, 2013 at 2:56:45 pm) when the query is run on Apr. 15, 2013 (tax day 2013). The fact that the two results both contain 1444 records may be persuasive that the results are the same (e.g., the data needed/computed for the query has not changed such as no more sales of a particular product have been made) but the fact that the identifier is 03312013_00145645 may indicate that the results may be different. Thus, the data-change temporal-identifier may be useful to determine the result of the query may be changed.

In embodiments, determining the first dynamic data function is nondeterministic may include determining the first dynamic data function is a specific system function. As such, determining the first dynamic data function is nondeterministic may include determining a computed value of the specific system function to be changed based on a varied-parameter for the specific system function. For example, consider a case where the specific system function uses the exponentiation where two to the power of a number produces a result (i.e., $2^n=x$). In the case where this is the first dynamic data function, the first dynamic data function may be considered nondeterministic because the computed value of the specific system function (i.e., the computed value is x) may change based on the varied-parameter (i.e., n) for the specific system function ($2^n$). As another example, a determined/computed value for a set of digits of an IP address for a data center used for cloud computing may change based on a varied-parameter such as a data warehouse used for application processing given requests received by differing geolocations having identified load requirements (e.g., requests by one user in one location with one load requirement may be processed at different data centers under differing circumstances affecting the overall cloud computing environment such as other requests by other users).

At block 530, a first special value may be determined. The first special value can represent the first output value for the first field (e.g., in embodiments when a nondeterministic dynamic data function is present the remainder of the index may be populated as usual). The first special value may be determined in response to the first dynamic data function being nondeterministic. The special value may indicate that a DDF is used to determine the value of the field. For example, the special value may be "Δ" in embodiments.

At block 540, the first special value (e.g., "Δ") for the first field may be stored (in the index). Such storing may occur in response to determining the first special value for the first field. In embodiments, the index may be created on a first system. A request to create the index on a second system may occur, be instantiated, or be received. The index on the first system may be invalidated, archived, or deleted (in response to the request to create the index on the second system). Using the first dynamic data function, the index may be created on the second system. For example, the first special value for the first field may be stored (in the index) on the first system and subsequently the first special value for the first field may be stored (in the index) on the second system. Method 500 may conclude at block 599. Method 500 may have positive impacts on performance or efficiency of the DBMS.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer program product comprising a computer readable storage medium having program instructions embodied therewith, the program instructions executable by a processor to cause the processor to perform a method comprising:
   determining that a first field includes a first input value configured to identify a first dynamic data function utilized to determine a first output value for the first field, wherein the first field is included in a table of a database, the first dynamic data function being a database query;
   determining, in response to a request to create an index including the first field, that the first dynamic data function is deterministic, wherein determining the first dynamic data function is deterministic includes determining that a result of the query is unchanged based on a data-change temporal-identifier;
   determining, in response to the first dynamic data function being deterministic, the first output value for the first field using the first dynamic data function; and
   storing in the index, in response to determining the first output value for the first field, the first output value for the first field.

2. The computer program product of claim 1, wherein the first dynamic data function includes a specific system function, wherein the method performed by the processor further comprises:
   creating a specific index for the specific system function.

3. The computer program product of claim 1, wherein the method performed by the processor further comprises creating a sparse index using the first output value for the first field.

4. The computer program product of claim 1, wherein determining the first dynamic data function is deterministic includes analyzing a first dynamic data function definition, stored in one of a bit map or a multi-dimensional array, that defines the first dynamic data function.

5. The computer program product of claim 1, wherein determining the first dynamic data function is deterministic includes determining, in response to determining the first dynamic data function is a specific system function, a computed value of the specific system function to be unchanged based on a varied-parameter for the specific system function.

6. The computer program product of claim 1, wherein the index is created on a first system, and wherein the method performed by the processor further comprises:
   invalidating, in response to a request to create the index on a second system, the index on the first system; and
   creating, using the first dynamic data function, the index on the second system.

7. The computer program product of claim 6, wherein the method performed by the processor further comprises:
   deleting, in response to receiving the request to create the index on the second system, the index on the first system.

8. The computer program product of claim 1, wherein the determining that a result of the query is unchanged based on a data-change temporal-identifier comprises:
   executing a first query run using the first dynamic data function at a first time;
   executing a second query run using the first dynamic data function at a second time, the second time being subsequent to the first time;
   comparing results from the execution of the query at the first and second times, wherein the results include a particular data-change temporal-identifier; and
   determining, based on the comparing, that results of the first and second query runs have the same data-change temporal-identifier.

9. The computer program product of claim 1, wherein the first input value includes a tag that identifies the first dynamic data function as being utilized to determine the first output, wherein the tag is configurable by a user.

10. The computer program product of claim 1, wherein the first field has a first data type, the first data type indicating that the first field includes a dynamic data function.

11. The computer program product of claim 1, wherein the first field includes a checkbox system that is configured to identify the first dynamic data function as deterministic.

12. The computer program product of claim 1, wherein the determining that the first dynamic data function is deterministic comprises:
  determining that the first dynamic data function is configured to compute a value for a set of digits of an IP address for a data center used for cloud computing.

13. A computer program product comprising a computer readable storage medium having program instructions embodied therewith, the program instructions executable by a processor to cause the processor to perform a method comprising:
  establishing a table of a database that includes a first field having a first input value configured to identify a first dynamic data function utilized to determine a first output value for the first field, the first dynamic data function being a database query;
  determining, in response to a request to create an index including the first field, that the first dynamic data function is nondeterministic, wherein determining the first dynamic data function is nondeterministic includes determining that a result of the database query is changed based on a data-change temporal-identifier;
  determining, in response to the first dynamic data function being nondeterministic, a first special value to represent the first output value for the first field; and
  storing in the index, in response to determining the first special value, the first special value for the first field.

14. The computer program product of claim 13, wherein determining the first dynamic data function is nondeterministic includes analyzing a first dynamic data function definition, stored in one of a bit map or a multi-dimensional array, that defines the first dynamic data function.

15. The computer program product of claim 13, wherein the index is created on a first system, and wherein the method performed by the processor further comprises:
  invalidating, in response to a request to create the index on a second system, the index on the first system; and
  creating, using the first dynamic data function, the index on the second system.

16. The computer program product of claim 13, wherein determining the first dynamic data function is nondeterministic includes:
  determining that the first dynamic data function is a query;
  executing a first query run using the first dynamic data function at a first time;
  executing a second query run using the first dynamic data function at a second time, the second time being subsequent to the first time;
  comparing results from the execution of the query at the first and second times; and
  determining, based on the comparing, that results of the first and second query runs are different.

17. The computer program product of claim 13, wherein the first field has a first data type, the first data type indicating that the first field includes a dynamic data function, and wherein the first field includes a checkbox system that is configured to identify the first dynamic data function as nondeterministic.

18. A computer program product comprising a computer readable storage medium having program instructions embodied therewith, the program instructions executable by a processor to cause the processor to perform a method comprising:
  establishing a table of a database that includes a first field having a first input value configured to identify a first dynamic data function utilized to determine a first output value for the first field, the first dynamic data function being a specific system function;
  determining, in response to a request to create an index including the first field, that the first dynamic data function is nondeterministic, wherein determining the first dynamic data function is nondeterministic includes determining that a computed value of the specific system function is changed based on a varied-parameter for the specific system function;
  determining, in response to the first dynamic data function being nondeterministic, a first special value to represent the first output value for the first field; and
  storing in the index, in response to determining the first special value, the first special value for the first field.

* * * * *